INVENTORS
WILLIAM K. MATHEWS
CARL C. PERKINS, JR.
BY
Bayard H. Michael
ATTORNEY

Jan. 15, 1963 W. K. MATHEWS ETAL 3,072,967
FLEXIBLE MOLD
Filed July 28, 1959 5 Sheets-Sheet 3

INVENTORS
WILLIAM K. MATHEWS
CARL C. PERKINS, JR.
BY Bayard H. Michael
ATTORNEY

Jan. 15, 1963   W. K. MATHEWS ETAL   3,072,967
FLEXIBLE MOLD
Filed July 28, 1959   5 Sheets-Sheet 4

INVENTORS
WILLIAM K. MATHEWS
CARL C. PERKINS, JR.
BY
ATTORNEY

Jan. 15, 1963　　W. K. MATHEWS ETAL　　3,072,967
FLEXIBLE MOLD
Filed July 28, 1959　　5 Sheets-Sheet 5

INVENTORS
WILLIAM K. MATHEWS
CARL C. PERKINS, JR.
BY
ATTORNEY

United States Patent Office 3,072,967
Patented Jan. 15, 1963

3,072,967
FLEXIBLE MOLD
William K. Mathews, Prairie Village, Kans., and Carl C. Perkins, Jr., Kansas City, Mo., assignors to Controls Company of America, Schiller Park, Ill., a corporation of Delaware
Filed July 28, 1959, Ser. No. 830,103
3 Claims. (Cl. 18—36)

This invention relates to a mold, particularly for mass production of encapsulated electrical coils.

Encapsulation of electrical coils with an epoxy resin on a mass production scale has presented several difficult problems due to the abrasive and adhesive character of epoxy resin. Current producers use die cast or machined molds which are costly and have a relatively short life. The coils are placed in preheated molds which have been sprayed with a release agent and a batch of resin is prepared and poured into the molds. After curing the coils are removed from the molds and the mold resurfaced for the next use.

The present invention relates to an assembly line type of operation rather than the foundry type operation and involves placing the coil in a mold which includes a flexible liner held firmly by spring pressure around the coil. The resin is poured into the space between the liner and coil and when set the coil is removed by moving the liner away from the coil. When the liner has worn out, the liner can be removed from the mold and a new liner can be substituted at a minimum of cost and time.

The primary object of this invention is to provide a mold which will lend itself to multiple casting without reworking between each cast.

Another object is to provide a mold which can be opened sufficiently to permit easy loading and unloading of the coil and which will close on the coil to effect a tight seal preventing leakage around the ends of the bobbin.

A further object of the invention is to provide a flexible mold.

Other objects and advantages will be pointed out in, or be apparent from the specifications and claims, as will obvious modifications of the single embodiment shown in the drawings, in which:

FIGURE 6 is a vertical section along line 6—6 of FIGURE 5.

FIGURE 7 is a vertical section taken along line 7—7 of FIGURE 3.

Figure 1:
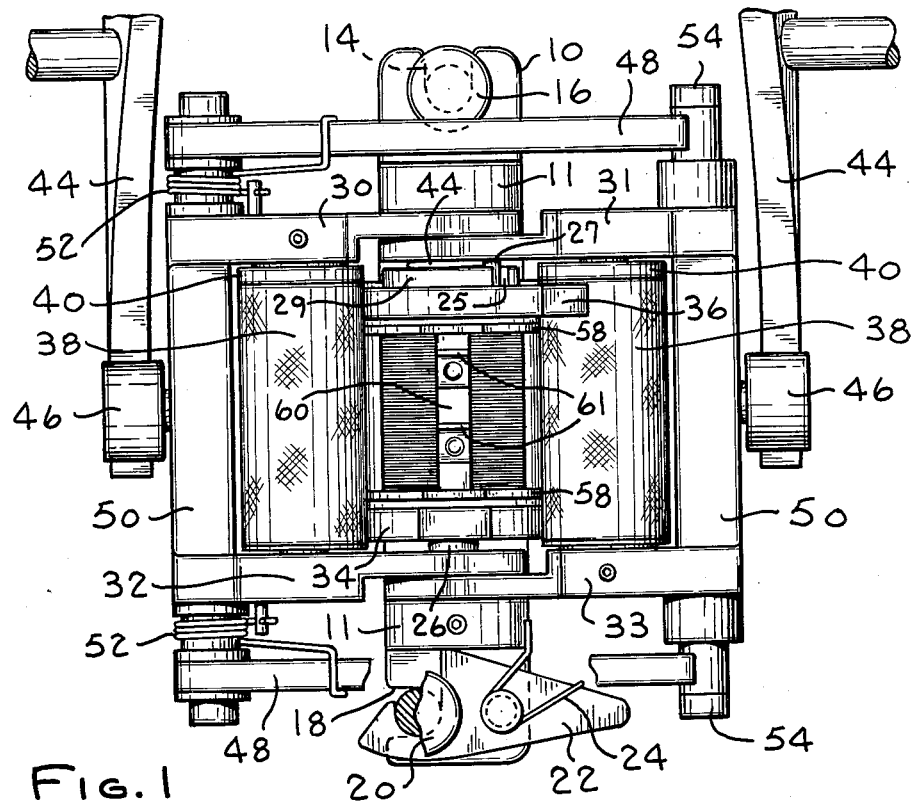
FIGURE 1 is a plan view of the mold in the open positon. The coil is in place and closing cams are partially shown.

As seen in the drawings, the mold consists of a base 10 having a boss 11 at each end. The base is secured to a conveyor belt 12 by engaging longitudinal slot 14 with pin 16 and rotating the base on pin 16 until transverse slot 18 engages pin 20. Latch 22 is biased by spring 24 into engagement with pin 20 to lock the base to conveyor. With this arrangement the molds can be easily attached to or removed from the conveyor for repair or replacement if worn or damaged.

Pins 26 and 28 coaxially mounted in the bosses support spaced arms 30, 31, 32 and 33. The outer ends of the arms are connected to cross bars 50 to form spreaders. An end member 34 is rigidly secured to pin 26 in a plane transverse to the pin axis. Pin 28 is threaded in boss 11 and has a head 29 which supports a second end member 36 parallel to end member 34. The end members are made from Teflon, (a tetrafluoroethylene polymer) and have a reverse curvature contour substantially similar to the ends of the coil to be encapsulated. A spring 44 is positioned on the pin 28 between the head and the boss to impart an axial force to the pin. A stud 27 in arm 31 operatively engages slot 25 in the head 29 so that the pin and member rotate with the spreader arm. Upon rotation the pin will be turned in the thread moving the Teflon member either toward the member 34 when the pin is turned in one direction or away from the member 34 when the pin is turned in the opposite direction.

Figure 10:
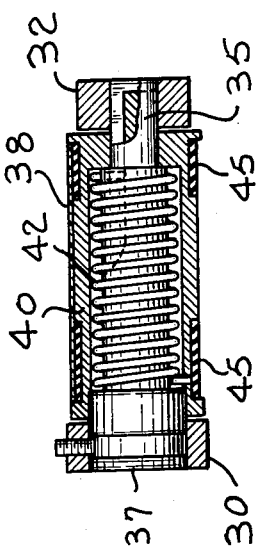
FIGURE 10 is a section taken along line 10—10 of FIGURE 9 showing a cross-section through the roller and springs.
Figure 12:
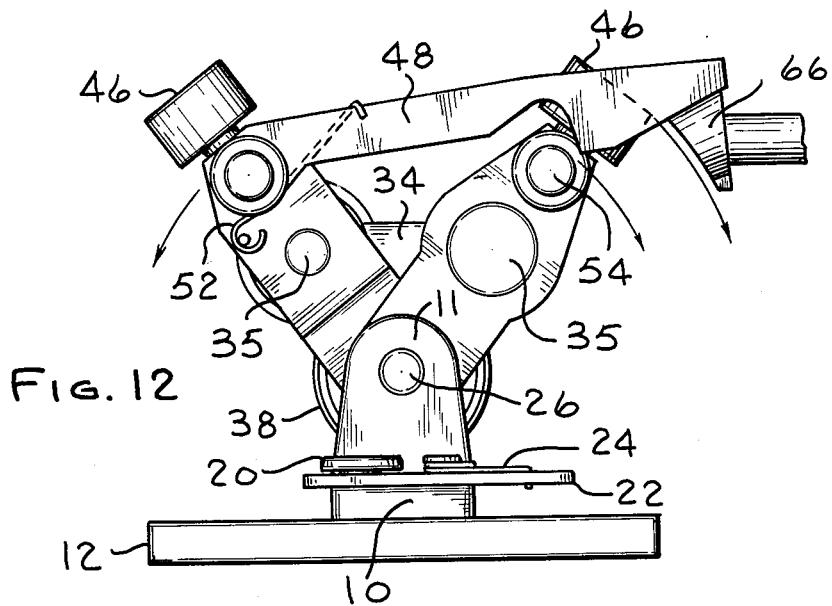
FIGURE 12 is an end view of the mold in the process of being opened by the cams.
Figure 13:
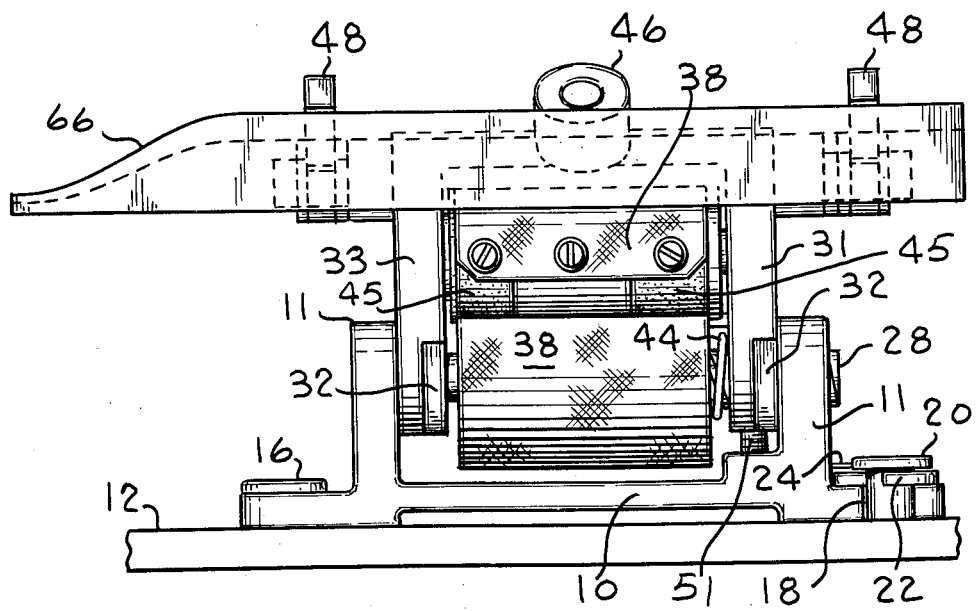
FIGURE 13 is a side elevation of the mold as shown in FIGURE 12.

A liner 38 consisting of Fiberglas impregnated with Teflon is stretched between rollers 40 which are mounted on rods 35 (FIGURE 10) and are biased by springs 42. The rods 35 are provided with a head 37 that seats in arms 30 and 33. The rods are fitted into the spreaders from opposite directions so that bias of the rollers is in opposite directions and the liner is stretched between the rollers around the periphery of the Teflon end members forming a cavity therein. The rollers roll on the reverse curvature contoured section of the Teflon members either rolling the liner away from the Teflon members on opening the spreaders or rolling the liner against the Teflon members to close the cavity and form a mold between the Teflon members.

Figure 2:
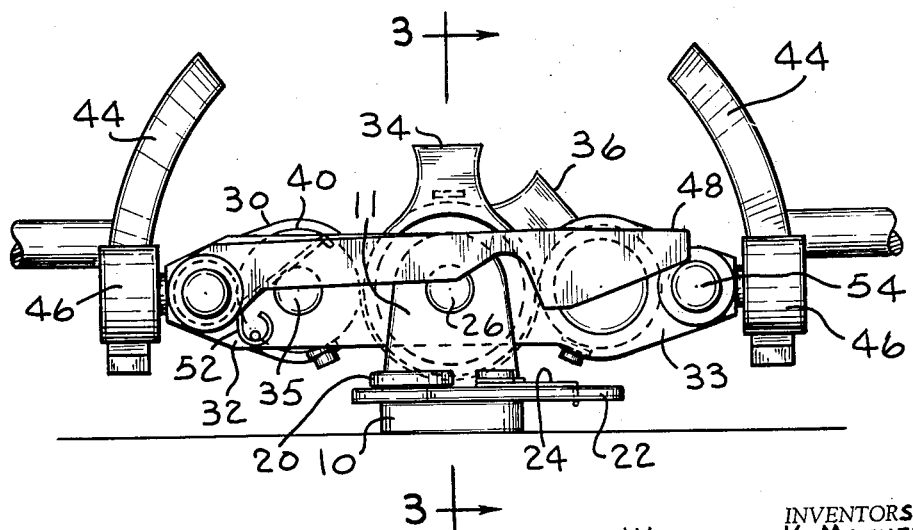
FIGURE 2 is an end view of FIGURE 1 showing the latches in an open position.
Figure 3:
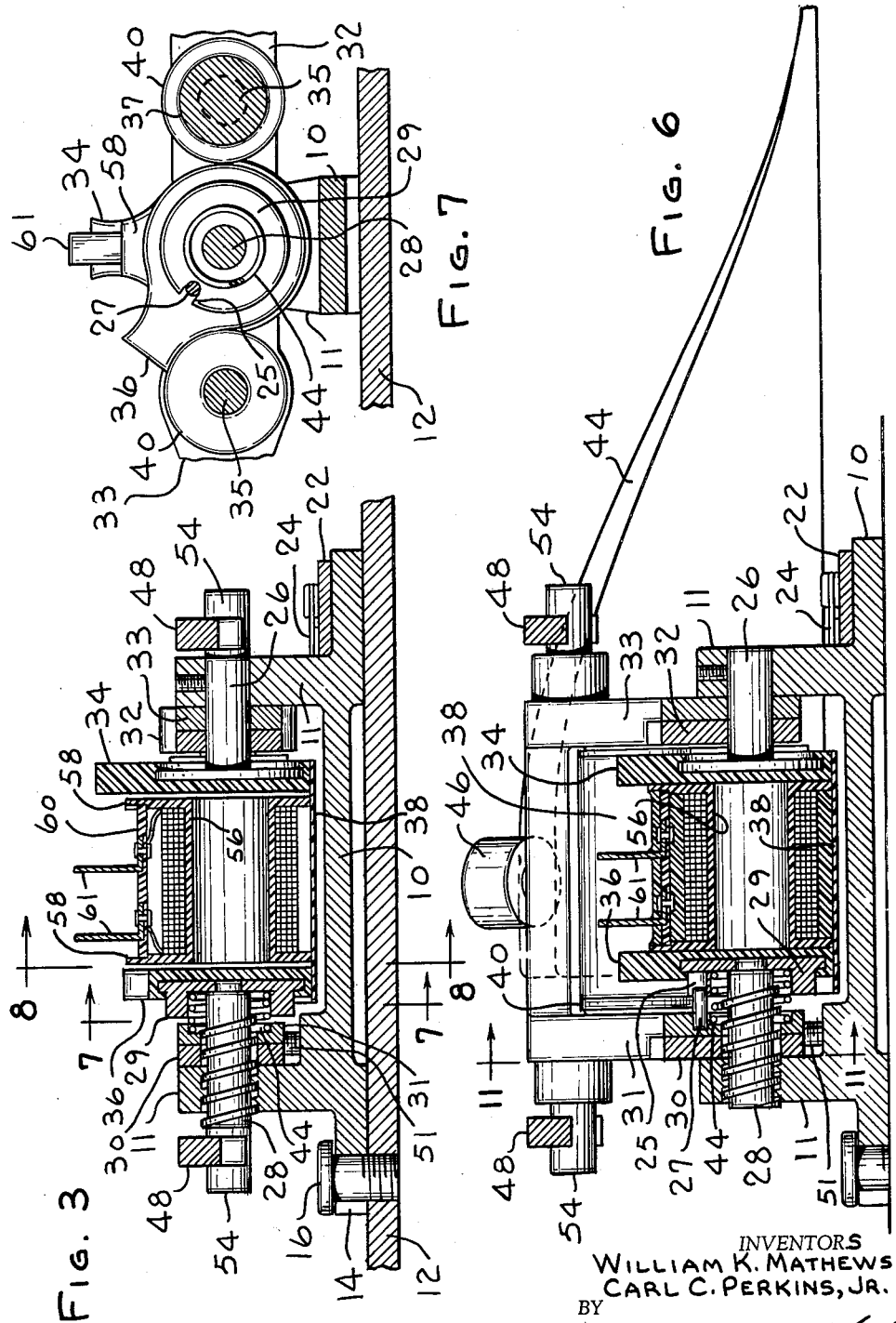
FIGURE 3 is a vertical section along line 3—3 of FIGURE 2.
Figure 4:
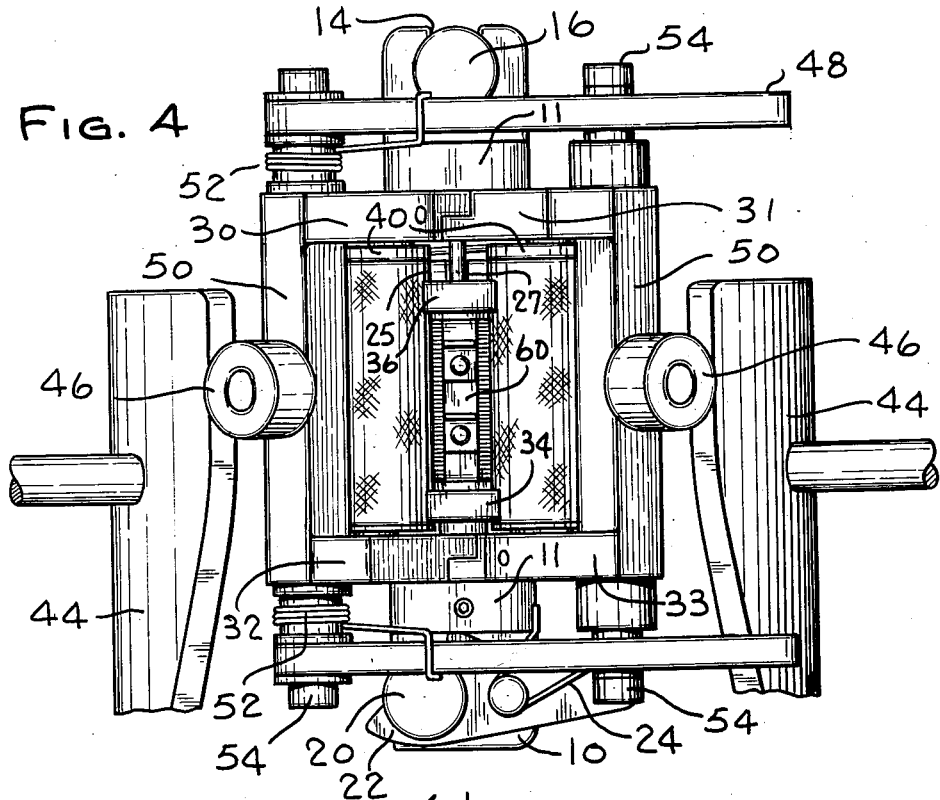
FIGURE 4 is a plan view of the mold in a closed position. The end portion of the posing cams are shown.
Figure 5:
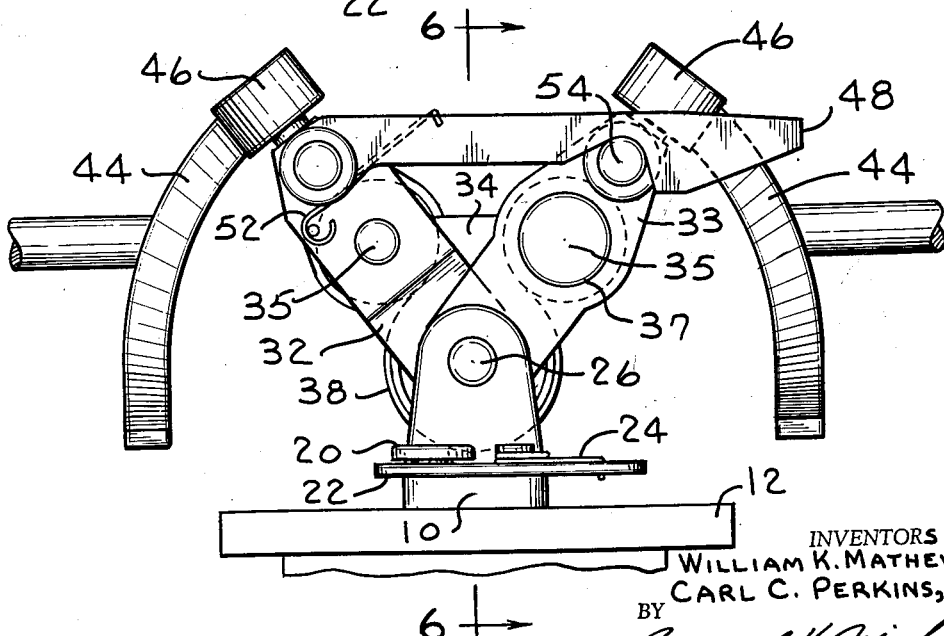
FIGURE 5 is an end view of FIGURE 4 showing the latches in a locked position.
Figure 9:
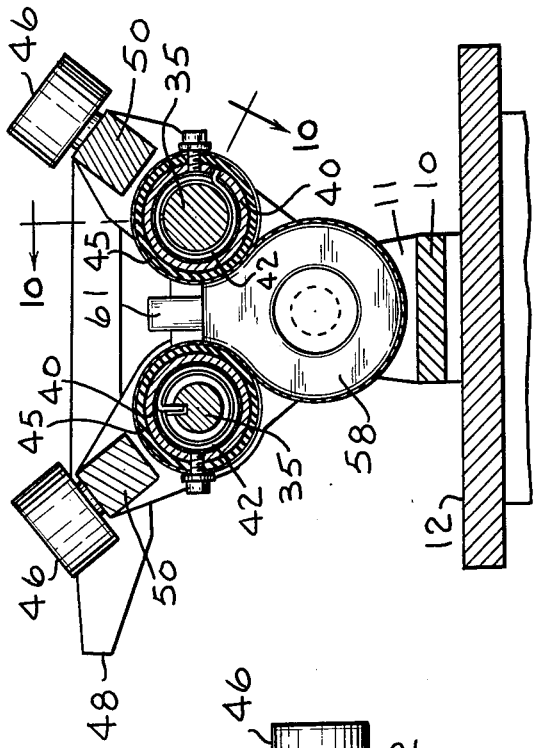
FIGURE 9 is a vertical section like FIGURE 8 only with the mold closed and locked.
Figure 11:
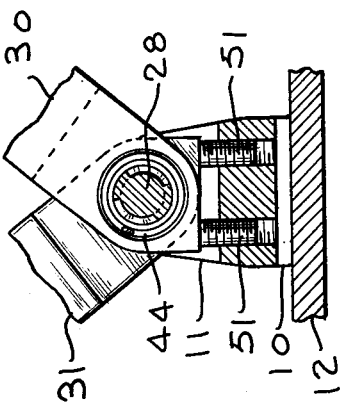
FIGURE 11 is a vertical section taken along line 11—11 of FIGURE 6.
Figure 8:
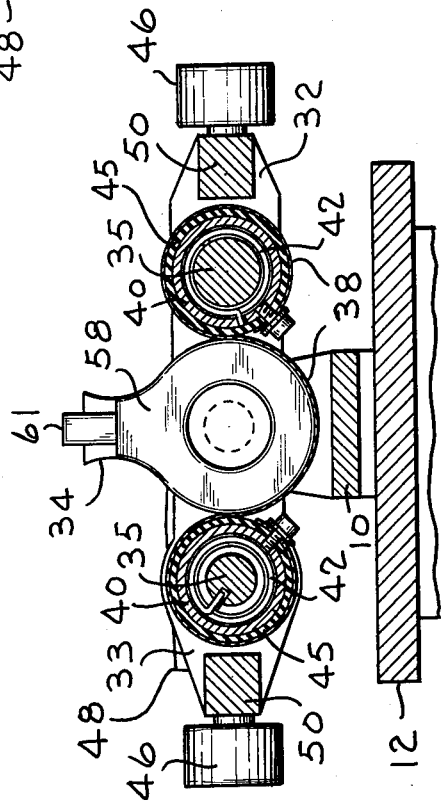
FIGURE 8 is a vertical section taken along line 8—8 of FIGURE 3 with the mold in an open position.

A coil (FIGURE 3) consisting of a bobbin 56 including a pair of end members 58, a bridge 60 disposed between the end members and spade terminals 61 is held by a set of fingers (not shown) above the conveyor belt. As the mold is moved beneath the coil, Teflon member 34 will engage the coil and knock it from the finger into the open mold. Teflon member 36 is positioned to the side (FIGURE 2) so that it will not hit the coil as the mold is passed beneath the coil. The spreaders are raised to an upright position by passing the mold between a pair of cams 44 so that cam followers 46 on crossbars 50 ride up on the cam surfaces. Latches 48 are pivotally secured to each end of the crossbar 50 and are biased by springs 52 to engage posts 54 on the ends of crossbar 50 to hold the spreaders in the closed position. The upward movement of the spreaders is limited by set screws 51 positioned in the base to engage the lower ends of arms 30 and 31 (FIGURE 11). The pin 28 and contoured member 36 are rotated with the arm 31 unscrewing the pin from boss 11 and moving member 36 to an upright position and axially toward member 34 to clamp the coil therebetween. The contour of the end members is substantially the same as the ends of the coil and the rollers will roll around the periphery of the ends of the end members wrapping the liner around the coil when the spreaders are moved to their closed position. An elastic strip 45 is provided on each end of the rollers behind the liner so that the ends of the coil will be seated in the liner. A cavity is formed between the liner and the inside of the coil in which the resin is poured. The bridge 60 of the coil is narrow having a space between the rollers and the bridge for the resin to flow through. The Teflon end members provide a backing for the coil to prevent leakage around the edges of the coil when the resin is poured into the cavity. The mold is then filled with resin and a sufficient time interval is allowed for the resin to set.

The mold is next passed over cam 66 which engages the outer extremities of the latch rods, disengaging the rods from the post. The force of the spring 52 on the latch rods will cause the spreaders to move supporting the latches to a horizontal position. The outer extremity of the latch rod will act on post 54 forcing the other spreader to a horizontal position also. The rollers roll around the outer periphery of the end members, winding up the liner as they are moved to the horizontal position, thus opening the mold. The post 28 will screw into the base as it is rotated by the arm 31 retracting member 36 axially away from the coil so that the coil can be lifted out of the mold.

Since the Fiberglas is impregnated with Teflon it will peel from the resin when the mold is opened. This type of liner can be utilized for a number of casts before resin will stick to it. Copending application No. 840,653, filed September 17, 1959 shows a liner having a greater service life. Experience has indicated that the important feature is to provide a mold that is flexible so that it can be wrapped around the article to be potted and suitably backed up. The end members do not effect any particular sealing function but are fabricated from Teflon so that any resin splashed thereon can be easily cleaned off. Consideration of the principles involved here suggest the possibility of using expendable liner inserts in conjunction with this arrangement to minimize the problem of resin adhering to the liner itself.

Although but one embodiment of the present invention has been illustrated and described, it will be apparent to those skilled in the art that various changes and modificaions may be made therein without departing from the spirit of the invention or from the scope of the appended claims.

We claim:

1. A mold for encapsulating an electric coil comprising a base, a pair of pins mounted on the base in a coaxial relation, a pair of spreaders each having an arm mounted on each pin, said spreaders each carrying a roller on an axis parallel to the pin axis, an end member secured to each pin normal thereto and within the spreaders, means biasing the spreaders away from said end members and a flexible liner having one end secured to each roller and positioned to seat on the periphery of the end members to form a pocket therebetween when the spreaders are rolled around the periphery of the end members, said biasing means including means for holding said spreaders against said end members.

2. A flexible mold for encapsulating an electrical coil comprising a base, a pair of spreaders pivotally mounted on the base on a common axis, means for biasing the spreaders to a horizontal position, a roller secured to each spreader on an axis parallel to and spaced from the common axis, a pair of end members mounted on the spreaders in a plane transverse to the common axis, a flexible liner having an end wound on each roller, a spring in each roller biasing the rollers in opposite directions to hold the liner tight between them, and means for holding the spreaders in an upright position so that the liner wraps around the periphery of the end members to form a cavity therein.

3. A mold for encapsulating an electrical coil comprising a base, a pair of spreaders pivotally mounted on the base on a common axis, a roller secured to each spreader on an axis parallel to and spaced from the common axis, a pair of end members mounted on the spreaders in planes transverse to the common axis, a flexible liner having an end wound on each roller, a spring in each roller biasing the rollers in opposition to hold the liner tight between them, said spreaders being rotatable to a closed position, and means for holding the spreaders in the closed position so that the liner wraps around the end members.

References Cited in the file of this patent

UNITED STATES PATENTS

| | | |
|---|---|---|
| 47,827 | Hugunin | May 23, 1865 |
| 1,064,741 | Jones | June 17, 1913 |
| 1,126,853 | Peterson | Feb. 2, 1915 |
| 1,875,256 | Nagel | Aug. 30, 1932 |
| 2,406,005 | Doherty | Aug. 20, 1946 |
| 2,440,754 | Nagel | May 4, 1948 |
| 2,511,436 | Kauth | June 13, 1950 |
| 2,611,930 | Hill et al. | Sept. 30, 1952 |
| 2,882,504 | Hultgren | Apr. 14, 1959 |
| 2,941,570 | Plym | June 21, 1960 |

FOREIGN PATENTS

| | | |
|---|---|---|
| 802,713 | Great Britain | Oct. 8, 1958 |